United States Patent [19]

Robinson

[11] Patent Number: 4,475,483
[45] Date of Patent: Oct. 9, 1984

[54] CATALYST DELIVERY SYSTEM

[76] Inventor: Barnett J. Robinson, 502 Boylston St., Brookline, Mass. 02146

[21] Appl. No.: 485,439

[22] Filed: Apr. 15, 1983

[51] Int. Cl.³ ............................................. F02B 75/12
[52] U.S. Cl. ...................................... 123/1 A; 123/3; 123/198 A; 123/25 E; 44/68; 261/18 A; 431/126; 431/4
[58] Field of Search ............ 123/1 A, 3, 25 R, 198 A, 123/25 E; 431/126, 4; 502/224, 174, 200, 344, 300; 44/68, DIG. 3; 261/18 A

[56] References Cited

U.S. PATENT DOCUMENTS

| 3,450,116 | 7/1964 | Knight et al. | 123/198 A |
| 3,862,819 | 1/1975 | Wentworth, Jr. | 431/4 |
| 3,945,366 | 3/1976 | Matthews | 123/198 A |
| 4,014,637 | 3/1977 | Schena | 431/4 |
| 4,016,837 | 4/1977 | Wentworth, Jr. | 431/4 |
| 4,090,838 | 5/1978 | Schena et al. | 123/25 R |
| 4,362,130 | 12/1982 | Robinson | 123/198 A |
| 4,410,467 | 10/1983 | Wentworth, Jr. | 431/4 |
| 4,419,967 | 12/1983 | Protacio et al. | 123/198 A |

Primary Examiner—Ethel R. Cross
Attorney, Agent, or Firm—David M. Warren

[57] ABSTRACT

A system for delivering a catalyst into a forced draft entry port of a chemical reaction chamber, such as a fossil-fuel combustion chamber, includes a container having an aqueous solution of the catalyst. A suction line extends from an air space above the solution to the entry port. An intake line at atmospheric pressure enters the container and has an end submerged below the surface of the aqueous solution, the submerged end having a float for maintaining the end at a predetermined distance below the surface and thereby establishing a predetermined back pressure. A layer of oil floats on top of the aqueous solution and may contain a second dissolved catalyst. The air from the intake line bubbles up through the aqueous solution and the oil layer absorbing minute quantities of the catalysts which are carried by the air into the reaction chamber. Rhenium and manganese catalysts improve the efficiency of fossil-fuel combustion such as that of the home oil burner and the automotive engine. Ethylene glycol serves as a surfactant and as an antifreeze agent. Group-1 chlorides in solution inhibit precipitation of the catalyst by the surfactant.

22 Claims, 5 Drawing Figures

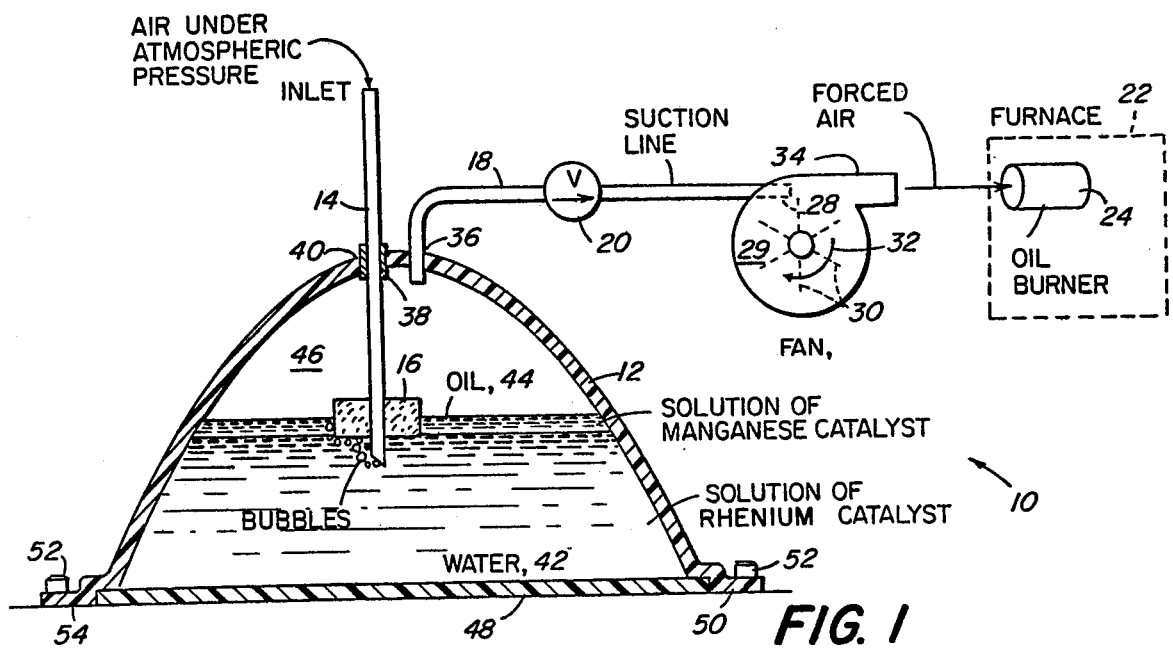
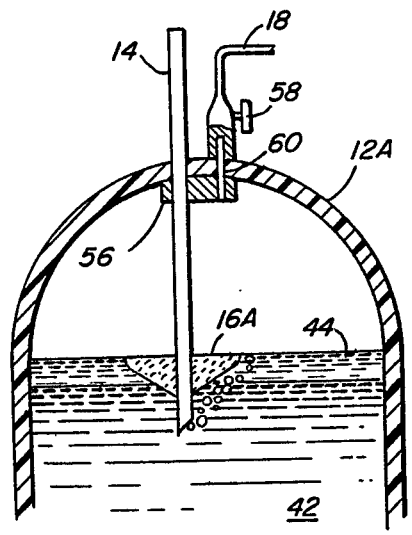
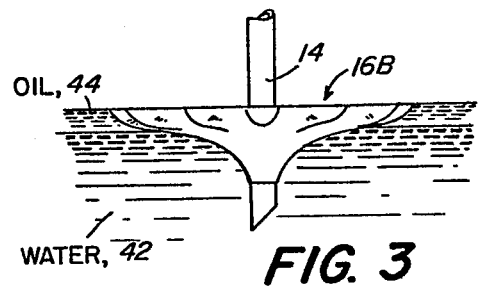
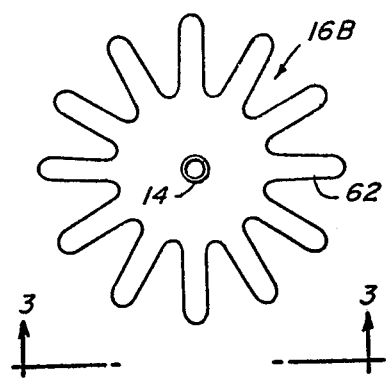

CATALYST DELIVERY SYSTEM

BACKGROUND OF THE INVENTION

Water has been used to improve fossil fuel combustion in both automotive engines and oil-fired furnaces. In the case of automotive engines, wherein gasoline is burned in air, the air has been mixed with water to increase its humidity prior to the mixing of the gasoline with the air. In the case of oil-fired furnaces, steam has been used to atomize the oil. Various techniques have been used for the mixing of water with the constituent substances of the combustion process. These techniques include the spraying of water into a chamber of air as taught in U.S. Pat. No. 3,107,657 which issued in the name of D. Cook, the passing of water through gasoline as taught in U.S. Pat. No. 3,724,429 which issued in the name of N. Tomlinson, the forcing of a stream of fine bubbles of air through water as taught in U.S. Pat. No. 3,767,172 which issued in the name of H. Mills, and the injection of a fine spray of water into a gas flame as taught in U.S. Pat. No. 3,809,523 which issued in the name of W. Varekamp. A more recent technique, taught in U.S. Pat. No. 3,862,819 which issued in the name of F. Wentworth, involves the diversion of a small portion of the inlet air to a combustion chamber, and the bubbling of the air through water covered with a layer of oil. The bubbling of air through a solution of a platinum compound is taught in U.S. Pat. No. 4,295,816 which issued in the name of B. J. Robinson.

A problem arises with the techniques taught by the first four of the aforementioned patents in that they require the continuous replenishment of the water supply. While water use has been reduced in the system of the aforementioned Wentworth patent, it is desirable to increase the efficiency of the combustion to a greater extent than that provided by Wentworth. Also, as noted by Wentworth, the systems of the first four of the aforementioned patents with the larger use of water may cause damage such as the shortening of the life of an automotive engine.

SUMMARY OF THE INVENTION

In accordance with the invention, the aforementioned problems are overcome and other advantages are provided by a system incorporating one or more catalysts which are dissolved in liquids through which a gas is bubbled for subsequent passage into a chamber wherein a chemical reaction, such as the combustion of a fossil fuel, takes place. In a preferred embodiment of the invention utilized for the delivery of minute quantities of water containing a catalyst to the oil burner of a furnace, the system of the invention comprises a flask containing water in which has been dissolved a catalyst, namely, a compound of rhenium. A petroleum-based oil layer is floated on top of the water to control the bubbling and prevent a splattering and the attendant formation of aerosols. If desired, a second catalyst which is insoluble in water, such as manganese naphthanate, may be dissolved in the oil.

In both the cases of an automotive engine and an oil-fired furnace, there is a forced air intake port, or suction port, to which is attached a suction line from an airspace in the flask above the layer of oil. An intake line brings air at atmospheric pressure into the flask, an end of the intake line being submerged below the surface of the water to provide for the bubbling of air through the water and oil in response to the suction of the suction line. A float is attached to the suction line for floating the end of the suction line at a predetermined depth to establish a predetermined back pressure, whereby the bubbling is regulated by the difference between the suction pressure and the atmospheric pressure independently of the depth of the water. The dissolving of the rhenium and manganese catalysts provides for a fine dispersion of the catalyst at the molecular level which permits the absorportion of minute quantities of finely dispersed catalyst into the air bubbles. Intimate mixing of the catalysts with the constituent components of the combustion process is thereby attained. The flask with its floating inlet line and outlet suction line may be used for other catalysts. Liquids other than water, such as alcohol, may be utilized.

In a preferred embodiment of the invention, perrhenic acid is dissolved in the water to serve as a catalyst. The perrhenic acid decomposes at temperatures well below that of the deflagration temperatures of the foregoing engine and furnace and, accordingly, is believed to make molecular rhenium available to the burning fuel, thereby enhancing the combustion. Thus, it is seen that rhenium metal has been combined with oxygen, dissolved in water, carried off by air, and released as a metal at the combustion site at a temperature lower than the combustion temperature. Other suitable compounds of rhenium include the metaperrhenates and carbonyl halides. A surfactant such as ethylene glycol promotes fractionation of the rhenium catalyst from the solution during the bubbling of the gas therethrough. A group-1 chloride counteracts the tendency of the surfactant to precipitate the catalyst.

It is noted that the rhenium is beneficial in two respects. In addition to serving as a catalyst for more complete combustion of hydrocarbon in air, rhenium also tends to alter the chemical composition of a hydrocarbon by reforming a nonaromatic hydrocarbon molecule to an aromatic hydrocarbon molecule. In the burning of gasoline in an automotive engine, a pinging may be noticed when the octane of the gasoline is excessively low with respect to the compression ratio of the engine. When rhenium is used with gasoline, the foregoing reforming of the hydrocarbon molecule results in a raising of the octane, and a better controlled, more uniform rate of burning. Thus, the aspiration of rhenium into an automotive engine reduces the tendency to ping, a great advantage which provides a smooth running engine. The foregoing reformation process also provides for a more uniform flame front in an oil-fired furnace which aids in the efficient burning of the fuel.

BRIEF DESCRIPTION OF THE DRAWING

The aforementioned aspects and other features of the invention are explained in the following description taken in connection with the accompanying drawing: wherein FIG. 1 is a diagrammatic illustration of a catalyst delivery system in accordance with the invention;

FIG. 2 shows an alternative embodiment of the top portion of a flask of FIG. 1;

FIGS. 3 and 4 show, respectively, a side view and a plan view of an alternative embodiment of a float of FIG. 1.

DESCRIPTION OF THE PREFERRED EMBODIMENT

Figure 5:
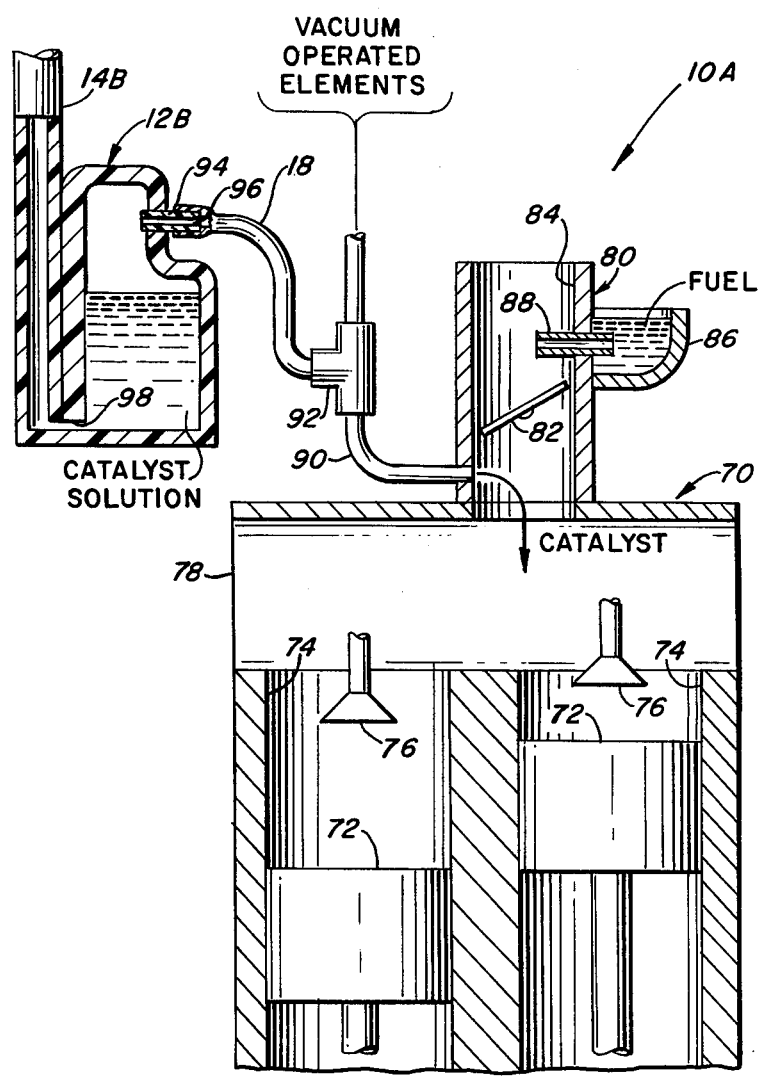
FIG. 5 is a stylized sectional view of a portion of an automotive engine incorporating the invention.

With reference to FIG. 1, there is shown a catalyst delivery system 10 constructed in accordance with the invention, the system 10 comprising a flask 12, a tube 14 having a float 16 positioned near the lower end thereof, a tube 18 having a shut-off valve 20, a furnace 22 with an oil burner 24 therein, and a centrifugal fan 26 which forces air into the burner 24. The tube 18 has an end 28 which is passed through an aperture in a housing 29 of the fan 26, the end 28 facing in the downstream direction of the airflow and thereby inducing suction in the tube 18. Vanes 30 rotate in the direction of an arrow 32 to draw air in at the port 32, and to discharge the air via a port 34. The tube 18 serves as an outlet of the flask 12 and is secured at an aperture 36 of the flask 12. The tube 14 is slidably secured to the flask 12 by a tube segment 38 which is fixedly secured to an aperture 40 of the flask 12. The upper end of the tube 14 is open to the atmosphere.

The flask 12 is partially filled with water 42, there being a layer of oil 44 placed on top of the surface of the water 42. The suction of the tube 18 reduces the pressure of the air in the space 46 above the oil 44 and the water 42 resulting in a lowering of the water level in the tube 14. The float 16 maintains the bottom end of the tube 14 at a predetermined distance below the surface of the water. The position of the float 16 on the tube 14 is adjusted so that the back pressure of the column of water in the tube 14 is less than the suction in the tube 18 with the result that atmospheric air is drawn down through the tube 14 and bubbles up past the float 16 and into the space 42. The bubbles of air absorb minute quantities of water vapor and oil as well as substances dissolved therein. In particular, soluble compounds of rhenium and manganese which serve as catalysts in combustion reactions are dissolved respectively in the water 42 and in the oil 44.

In accordance with the invention, the dissolving of catalysts in the liquids contained in the flask 12 provides a fine dispersion of the catalyst such that molecules of the catalyst can be carried off by the air of the bubbles and, then, via the air in the tube 18 to the combustion region within the furnace 22. In this connection, it is noted that the substances in the liquids of the flask 12 may be absorbed into the air in the manner of absorbing water vapor to make humid air, or alternatively, the substances may be suspended in the air such as aerosols or droplets of water in a fog. The absorption at the molecular level is preferred since it permits the metering of minute quantities of the catalysts in precisely the amount desired without any wasting of the catalyst. In contrast, the suspension of aerosols of of the catalyst is wasteful since far more catalyst is consumed than is required. In addition, the suspension of aerosols consumes much of the water so that refilling of the flask 12 would be required at much more frequent intervals.

The viscosity of the liquid is an important factor in limiting the production of aerosols from the bursting of bubbles at the interface of the liquid and the air. Thus, while a liquid of lower viscosity such as water permits a vigorous bubbling and the consequent spattering and formation of aerosols, a viscous liquid such as heavy oil permits no more than a gradual movement of bubbles without the splattering and formation of aerosols. The layer of oil 44 has sufficient viscosity to insure that no splattering of either the oil 44 or the water 42 occurs with the consequent conservation of the liquids, the oil 44 and the water 42 with the catalyst dissolved therein.

The flask 12 is made of a rigid material impervious to the liquids contained therein. In the case of the preferred embodiment wherein oil and water are contained within the flask 12, the flask 12 may be made of glass or, preferably, of a shatter-resistant plastic, which is also resistant to the chemicals contained within the flask. The float 16 is in the form of a right circular cylinder made of foamed polyurethane, and has an aperture therein for the passage of the tube 14. In assembling the flask 12, the float 16 is first positioned upon the tube 14, and then the tube 14 is passed through the open bottom of the flask 12 and slid through the tube segment 38. A cover plate 48 is then adhesively secured to a rim 50 around the bottom edge of the flask 12. Bolts 52 pass through a flange 54 of the flask 12 for securing the flask 12 to a mounting surface such as the floor of a furnace room. The lower end of the tube 14 is cut at an angle of approximately 45° to permit bubbling even in the case where the bottom end of the tube 14 is near to or in contact with the cover plate 48. The cover plate 48, the tubes 14 and 18, and the tube segment 38 are all advantageously constructed of the same material used in making the flask 12.

The tube segment 38 has a length of one inch and an inside diameter of 0.750 inch. The tube 14 has an inside diameter of ⅝ inch. The outside surface of the tube 14 is ground to provide an outside diameter of 0.748 inch which is 0.001 inch clearance around the tube 14. Thereby, there is sufficiently snug fit between the tube 14 and the tube segment 38 to permit no more than a negligible amount of air to pass between the tube 14 and the tube segment 38 while permitting the tube 14 to slide within the tube segment 38. The flask 12 has a paraboloidal shape with a height of nine inches and a base diameter of sixteen inches. The flask may be formed by blow molding butadiene styrene or biaxially blow-molded polypropylene so as to provide a transparent dispenser, which permits viewing of the contents. The diameter of the tube 18 may be equal to that of the tube 14, or slightly smaller such as ½ inch outside diameter.

With reference to FIG. 2, there is shown an alternative embodiment of the top portion of the flask 12 of FIG. 1, identified by the legend 12A, the figure also showing an alternative form of the float identified by the legend 16A. A plate 56 of the same material as is utilized in making the flask 12A is adhesively secured to the inner surface of the top of the flask 12A. A valve 58, such as the shut-off valve 20 of FIG. 1, is secured by a section of pipe 60 having a ½ inch pipe thread to the plate 56. Instead of grinding the outer surface of the tube 14, the diameter of the tube 14 is retained at 0.750 inch, and the plate 56 is provided with an aperture which is reamed to 0.752 inch. The resulting clearance is that described above for flask 12 of FIG. 1. As may be seen in the sectional view, the lower edge of the float 16A is curved to provide for a smooth flow of bubbles around the float 16A.

With reference to FIGS. 3–4, there is shown an alternative embodiment of the float 16 of FIG. 1, the alternative embodiment being identified by the legend 16B. The bottom surface of the float 16B curves gently upwards towards the top surface for promoting a smooth flow of the bubbles. A set of spurs 62 is positioned about the periphery of the float 16B with the spurs 62 directed radially outward for retarding the propagation of bubbles through the oil 44 and thereby inhibiting any splattering. Thus, both the increased viscosity of the oil 44 and the physical structure of the float 16B coact to inhibit splattering and the formation of aerosols of water and oil.

With reference also to FIG. 1, it is seen that the time of propagation of a bubble through the layer of oil 44 depends on the thickness of the layer of oil and may be adjusted by adding or deleting a quantity of the oil. The propagation time within the water may be increased by enlarging the diameter of the float so as to lengthen the path through which the bubbles flow. In this way, the relative amounts of oil, water, and catalyst dissolved therein may be regulated. Oil such as that utilized in two-cycle gasoline engines has been utilized effectively for the layer of oil 44. The range of absorption of the catalyst into the air carried by the tube 18 is proportional to the bubbling rate which is regulated by the height of the column of water in the tube 14. The height of the column of water is preset by the aforementioned bending of the tube 14 to the atmosphere and the position of the float 16 relative to the end of the tube 14. Upon initial installation of the tube 14, the float 16 is positioned high up on the tube 14 and, the oil and water are then poured in through the top of the tube 14. After the oil and the water have reached their equilibrium positions and upon commencement of suction by the fan 26 via the tube 18, the float 16 is urged manually into position by withdrawing the tube 14 upwardly through the aperture in the top of the flask 12.

Suitable compounds of rhenium are perrhenic acid having the formula $HReO_4$ and its salts, metaperrhenates, and carbonyl halides. Compounds of the formula $MReO_4$ wherein M maybe K, Na, $NH_4$, and Rb may be utilized to provide water soluble compounds of the rhenium wherein M ionizes to $M^+$. Other compounds are $M_3ReO_5$ and $M_5ReO_6$. A suitable range of concentration is one part per billion to nine parts per million, by weight, of metallic rhenium to the fuel which is to be treated, 100 PPB being preferred.

By way of example, in the case where the oil burner 24 burns oil at a rate of approximately 15 gallons per hour, the flask 12 is filled to a height of six inches with water 42, and the layer of oil 44 is $\frac{1}{4}$ inch deep. The concentration of the catalyst in the solution is not critical since the bubbling rate can be adjusted to provide a desired metal/fuel ratio to the flame of the burner 24. A bubbling rate of 2-4 bubbles per second is preferred since it permits the rhenium compound to be fractionated out of the solution preferentially, so as to leave the solvent behind. Such fractionation is explained in an article entitled "A theoretical Approach to Nonfoaming Absorptive Bubble Fractionation" by Robert Lemlich published in the Journal of the of the American Institute of Chemical Engineering, July 1966, at Pages 802-804.

FIG. 5 shows an alternative embodiment of a catalyst delivery system, namely a system 10A incorporating the invention, which differs from the system 10 of FIG. 1 in that the system 10A of FIG. 5 utilizes an automotive engine 70 for applying suction to the tube 18 in lieu of the fan 26 of FIG. 1. The view of the engine 70 is stylized and shows only those components necessary to an understanding of the implementation of the invention. The engine 70 comprises pistons 72 reciprocally mounted within the cylinders 74, the cylinder 74 communicating via valves 76 to an intake manifold 78 for receiving a mixture of fuel and air to provide combustion within the cylinders 74. A carburetor 80 has a pivotable throttle valve 82 disposed within a throat 84 of the carburetor 80 for metering quantities of air and fuel into the intake manifold 78 wherein they are mixed to provide a homogeneous mixture of the air and the fuel. The air is shown being admitted directly into the throat 84 while the fuel is shown being admitted from an exemplary fuel bowl 86 and a jet 88 into the throat 84. As is well-known, a partial vacuum is produced in the intake manifold 78 by action of the pistons 72. The common practice in the construction of automotive vehicles is the utilization of the vacuum of the manifold 78 to operate other elements of the automobile, suitable connection to such elements being provided by a hose 90 connecting between the base of the carburetor 80 and the other elements(not shown). A tee 92 is set into the hose 90 so as to provide connection of the tube 18 to the hose 90. Thereby, the vacuum of the manifold 78 provides the necessary suction via the tube 18 for withdrawal of the catalyst from the flask 12 or 12A, and for uniformly distributing the catalyst among the cylinders from the base of the carburetor 80.

In the engine 70 of FIG. 5, the fuel, the air, and the catalyst are all aspirated into the manifold 78 by suction to produce a homogeneous blend of the catalyst with the fuel and the air. Thus, the catalyst may be referred to as a homogeneous catalyst as distinguished from a catalyst (not shown) which might be supported as a coating along an interior surface of a cylinder 74. The homogeneous catalyst is advantageous, as compared to the supported catalyst, in that the amount of catalyst which contacts the air-fuel mixture is independent of the formation of products of combustion and the presence of oil seepage which otherwise might form on the interior sides of the cylinders 74 and eventually impede the operation of a supported catalyst. The presence of the rhenium catalyst enhances, not only the combustion of the carbon of a hydrocarbon to produce carbon monoxide, but further enhances the combustion of the carbon monoxide with oxygen to produce carbon dioxide. The greatest amount of the thermal energy produced by the combustion process occurs in the conversion of the carbon monoxide to the carbon dioxide. Thus, the rhenium is useful in increasing the efficiency of both aspects of the combustion.

In accordance with a further feature of the invention, the rhenium is utilized in the reforming of the hydrocarbon molecules to alter their form of a nonaromatic molecule to an aromatic molecule. Thereby, there is an increase in the octane rating of the fuel to provide a better controlled and more uniform rate of burning. This reduces a tendency to ping, associated with the use of a fuel having an excessively low octane rating for the compression ratio of the engine. In addition, the rhenium reduces the effects of octane-creep associated with the aging of engines wherein a tendency to ping is counteracted by the use of a higher octane fuel. Thereby, it is seen that the invention provides for the control metering of the catalyst to provide a homogeneous distribution of the catalyst within the fuel-air mixture in the intake manifold so as to insure an efficient combustion along with an engine operation associated with the use of a higher octane fuel.

As a practical matter in the construction of a flask for automotive use, it is noted that the vehicular movements associated with an automobile would introduce an excessive amount of sloshing of the liquids within the flask 12 and 12A of FIGS. 1 and 2 so as to partially defeat the metering action of the floats 16 and 16A. Accordingly, the modified form of flask 12B, as depicted in FIG. 5, is preferred for the automotive use. The air inlet tube 14 of FIG. 1 is replaced with the inlet tube 14B of FIG. 5, and a metering action is provided by a cylinder 94 having a capillary bore 96. The tube 14B communicates with the interior of the flask 12B at the bottom of the flask, while the capillary bore 96 communicates between the tube 18 and an interior portion of the flask 12B above the level of the liquid contained therein. The flask 12B is readily fabricated with the rectangular box shape with the tube 14B disposed along a central portion of a side wall and the cylinder 94 being disposed on a central line of the opposite side wall of the flask 12B. Typical dimensions utilized in constructing the flask 12B are as follows. The height of the flask is 7 inches, the width of the flask is 3 inches, and the depth of the flask is 2 inches. The flask 12B is filled with liquid to a depth of approximately 5 inches. The tube 14B has a ¾ inch diameter and communicates with the interior of the flask 12B via an aperture having a diameter of ¼ inch diameter. The cylinder 94 has an outer diameter of 3/16 inch and a length of ¾ inch. The capillary bore 96 along the central axis of the cylinder 94 has a diameter of 0.005 inch. The foregoing diameter of the bore 96 is sufficiently small such that the liquid contained within the flask 12B cannot flow through the bore 96. It is only the small particles of the catalyst associated with the atomization thereof which are suspended in the air and drawn as an air suspension through the bore 96 into the tube 18, and from there into the manifold 78. During long periods of storage with the engine 70 turned off, the level of liquid within the tube 14B is equal to the level of liquid within the flask 12B. However, during use of the engine 70, the level of the fluid within the tube 14B drops to the location of the aperture 98 connecting the tube 14B to interior of the flask 12B. Also, the layer of oil 44 (FIG. 1) may be deleted in the embodiment of FIG. 5 since the capillary bore 96 will block any droplets or aerosols from entering the engine manifold.

The use of an antifreeze agent, for example, an alcohol such as enthanol or methanol, or a glycol such as propylene glycol or methylene glycol inhibits freezing of the catalyst solution in cold weather. The antifreeze agent is dissolved in the water in the flask 12, 12A, or 12B along with the catalyst. Since the antifreeze agent has the side effect of inducing precipitation of the catalyst, a further agent, referred to as a "blocking agent," is also dissolved in the water to block the precipitation and thereby retain the catalyst in solution. Suitable blocking agents are NaCl, HCl and LiCl. The lithium chloride is preferred since there is no acidity which might corrode an automotive engine.

Yet a further advantage is obtained with the use of the ethylene glycol, or other glycols. The ethylene glycol serves as a surfactant and reduces foaming. As a result, the perrhenic acid becomes more active at the interface between the water and air and is, thereby, more readily absorbed into the air by the bubbling of the aforementioned fractionation. Accordingly, the glycol is always utilized in the preferred embodiment of the invention irrespectively of whether the climate is warm or cold. The glycol is also preferred over the alcohol in that the glycol is less flammable and more readily available.

The following formulation is exemplary of the preparation of a solution of the catalyst. To provide fifteen ounces of solution, by weight, five ounces of ethylene glycol are dissolved in ten ounces of distilled water along with 0.4 ounces of LiCl. Then, 1.0 gram of perrhynic acid is dissolved in the water. The rhenium compound is always added last to insure that the blocking agent has become active to prevent precipitation of the catalyst. This formulation may be used both for the automotive case of FIG. 5 and the furnace of FIG. 1.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A system for the delivery of a catalyst containing not more than nine milligrams of rhenium metal per kilogram of fuel to an internal combustion engine having an intake port for air comprising:

means for dispensing said catalyst in a liquid; and means for passing air via said liquid for absorbing said catalyst into the air.

2. A system according to claim 1 wherein said catalyst is in the form of a compound soluble in said liquid.

3. A system according to claim 2 wherein said compound decomposes upon heating to a temperature lower than the deflagration temperature in a combustion chamber of said system.

4. A system for the delivery of a catalyst containing not more than nine milligrams of rhenium metal per kilogram of fuel to an internal combustion engine having an intake port for air comprising:

a dispensing vehicle containing said catalyst; and means for passing said air via said dispensing vehicle for absorbing said catalyst into said air.

5. A method for the delivery of a catalyst containing not more than nine milligrams of rhenium metal per kilogram of fuel to an internal combustion engine having an intake port for air comprising:

dispensing said catalyst in a dispensing agent; and passing said air via said dispensing agent for absorbing said catalyst into said air.

6. A system for the delivery of a catalyst containing a soluble compound of rhenium to an internal combustion engine having an intake port for air comprising:

a dispensing vehicle containing said catalyst; and means for passing said air via said dispensing vehicle for absorbing said catalyst into said air.

7. A method for the delivery of a catalyst containing a soluble compound of rhenium to an internal combustion engine having an intake port for air comprising:

dispersing said catalyst in a dispensing agent; and passing said air via said dispensing agent for absorbing said catalyst into said air.

8. A system for the dispensing of hydrocarbon reforming material to a combustion system, said combustion system being an internal combustion engine, said dispensing system comprising:

a reformer of hydrocarbon fuel to increase the octane thereof, said reformer containing rhenium;

means for aspirating said reformer into said combustion system; and means for aspirating fuel into said combustion system concurrently with said reformer to burn said fuel with the characteristics of a higher octane fuel.

9. A system according to claim 8 wherein said reformer and said fuel are aspirated into an intake manifold of said engine.

10. A system according to claim 9 wherein said reformer is a soluble compound of rhenium, and wherein said aspirating is accomplished by drawing air through a liquid in which said compound of rhenium is dissolved.

11. A system according to claim 8 wherein said reformer is a soluble compound of rhenium, and wherein said aspirating is accomplished by drawing air through a liquid in which said rhenium compound has been dissolved.

12. A system according to claim 9 wherein said reformer is a water soluble compound of rhenium, said compound decomposing upon heating to a temperature lower than the deflagration temperature of fuel in said engine; and wherein said reformer aspirating means includes means for holding an aqueous solution of said rhenium compound and means for metering air through said aqueous solution, said rhenium compound containing not more than nine milligrams of rhenium per kilogram of fuel burned in said engine.

13. A system for the delivery of a catalyst containing rhenium to an internal combustion engine for the combustion of fuel with an oxidant comprising:
means for dispensing said catalyst in a liquid; and
means for passing a gas via said liquid for carrying off quantities of said catalyst into said combustion system for mixing with said oxidant and said fuel.

14. A system according to claim 13 wherein said gas comprises said oxidant.

15. A system according to claim 13 further comprising surfaction means for increasing the efficiency of a fractionation of the rhenium catalyst from said liquid by the passage of said gas through said liquid.

16. A system according to claim 15 wherein said liquid is water, and said rhenium catalyst comprises compounds from a water soluble set of rhenium compounds consisting of perrhenic acid and its salts, higher order oxides of the salts, metaperrhenates and carbonyl halides of rhenium.

17. A system according to claim 16 wherein said surfaction means comprises a water soluble glycol and a blocking agent for inhibiting the precipitation of said catalyst.

18. A system according to claim 17 wherein said blocking agent is a water soluble chloride from the class consisting of hydrogen chloride, lithium chloride and sodium chloride.

19. A system according to claim 18 wherein said blocking agent is lithium chloride and said surfactant is ethylene glycol.

20. A system according to claim 15 wherein said fuel and said oxidant are in gaseous form during a mixing with said catalyst.

21. A system according to claim 13 further comprising means, dissolved within said liquid for inhibiting a freezing of the liquid, and means dissolved within said liquid for blocking a precipitation of said catalyst by said freeze inhibiting means.

22. A system according to claim 21 wherein said freeze inhibiting means is a glycol, and said blocking means is a Group-1 chloride.

* * * * *